United States Patent
Cai et al.

(10) Patent No.: US 10,108,351 B2
(45) Date of Patent: Oct. 23, 2018

(54) REALLOCATE MEMORY PENDING QUEUE BASED ON STALL

(71) Applicant: Hewlett Packard Enterprise Development LP, Houston, TX (US)

(72) Inventors: Qiong Cai, Palo Alto, CA (US); Paolo Faraboschi, Palo Alto, CA (US); Cong Xu, Palo Alto, CA (US); Ping Chi, Palo Alto, CA (US); Sai Rahul Chalamalasetti, Palo Alto, CA (US); Andrew C. Walton, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 146 days.

(21) Appl. No.: 15/190,276

(22) Filed: Jun. 23, 2016

(65) Prior Publication Data
US 2017/0371561 A1 Dec. 28, 2017

(51) Int. Cl.
*G06F 3/06* (2006.01)

(52) U.S. Cl.
CPC .......... *G06F 3/0613* (2013.01); *G06F 3/0631* (2013.01); *G06F 3/0653* (2013.01); *G06F 3/0685* (2013.01)

(58) Field of Classification Search
CPC .... G06F 3/0613; G06F 3/0631; G06F 3/0653; G06F 3/0685
See application file for complete search history.

(56) References Cited

U.S. PATENT DOCUMENTS

| 6,269,433 | B1 | 7/2001 | Jones et al. |
| 6,788,697 | B1* | 9/2004 | Aweya ............... H04L 49/90 370/235 |
| 7,093,097 | B2 | 8/2006 | Herr et al. |
| 7,499,960 | B2 | 3/2009 | Dageville et al. |
| 8,180,991 | B2 | 5/2012 | Ravindranath et al. |
| 2015/0242324 | A1* | 8/2015 | Novakovic ......... G06F 12/0813 711/121 |

OTHER PUBLICATIONS

Batsakis A et al., "The Johns Hopkins University & Network Appliance Inc., AWOL—An Adaptive Write Optimizations Layer", < https://www.usenix.org/legacy/event/fast08/tech/full_papers/batsakis/batsakis_html/ > (Research Paper), Feb. 28, 2008, 13 pages.

Xu et al., Overcoming the Challenges of Crossbar Resistive Memory Architectures, IEEE 2015 (13 pages).

* cited by examiner

*Primary Examiner* — Reginald G Bragdon
*Assistant Examiner* — Edward Wang
(74) *Attorney, Agent, or Firm* — Trop, Pruner & Hu, P.C.

(57) ABSTRACT

Techniques for reallocating a memory pending queue based on stalls are provided. In one aspect, it may be determined at a memory stop of a memory fabric that at least one class of memory access is stalled. It may also be determined at the memory stop of the memory fabric that there is at least one class of memory access that is not stalled. At least a portion of a memory pending queue may be reallocated from the class of memory access that is not stalled to the class of memory access that is stalled.

18 Claims, 6 Drawing Sheets

```
1    // s[i] indicates whether memory access class i is stalled
2    // T[i] is the allocation threshold for memory access class i
3    // m is the total number of memory access classes
4
5    void Change_MPQ_Threshold (bool s[i], int T[i], int m) {
6          int c=0;
7          int number_not_stalled = 0, number_stalled = 0;
8          for ( int i = 0; i < m; i++ ) {
9                if ( s[i] == FALSE ) {
10                     number_not_stalled++;
11                     if (T[i] – δ >= ε) {
12                           T[i] = T[i] – δ;
13                           c = c + δ;
14                     }
15               }
16         }
17
18         number_stalled = m – number_not_stalled;
19         int incr = c / number_stalled;
20         int extra = c % number_stalled;
21         for ( int i = 0; i < m; i++ ) {
22               if ( s[i] == TRUE ) {
23                     T[i] = T[i] + incr;
24                     last = i;
25               }
26         }
27         T[last] = T[last] + extra;
28   }
```

REALLOCATE MEMORY PENDING QUEUE BASED ON STALL

BACKGROUND

In memory centric computing architectures the entire memory space is addressable by all computing nodes. For example, a computing node may include a processor, such as one that might be included within a System on a Chip (SoC). The computing node may also include memory. The computing node may be inserted into an enclosure that includes some number of additional computing nodes. The enclosure may be inserted into a rack that includes some number of additional enclosures. Each SoC may be able to access all memory, regardless of if the memory is on the same node as the SoC, is within the same enclosure as the SoC, or within the same rack as the SoC.

The ability to access memory anywhere in the system is enabled through the use of a memory fabric. All memory within the system is connected to the memory fabric. Each SoC is also connected to the fabric. The memory fabric may be globally addressable. In other words, any SoC can access any portion of the memory, regardless of where that memory resides, through the use of the global address of that memory being accessed. The fabric itself takes care of any necessary routing of the memory access requests.

BRIEF DESCRIPTION OF THE DRAWINGS

FIGS. 1(A,B) are examples of a node and system including an SoC that may be used with the reallocation of memory pending queues according to the techniques described herein.

DETAILED DESCRIPTION

The ability to access any fabric attached memory allows for a processor to access an amount of memory that might not be otherwise available to a processor. For example, the processor may be limited in the amount of memory that may be directly connected to the processor. By utilizing a memory fabric, the limits of the amount of memory that can be accessed by a processor can be reduced, if not eliminated.

However, the use of a fabric may introduce a new problem. When a processor is directly attached to memory, the latency for a memory access remains relatively constant because the processor is directly connected to the memory. In other words (ignoring any overload conditions) an access to directly attached memory may always have the same latency, because all memory is directly attached.

In a memory fabric, the latency of access to a memory location may be depend on where on the fabric the memory is located. Some memory locations may be located "close" to the processor that is requesting access, and thus may have a lower latency. Other memory locations may be located "far" from the processor that is requesting access, and thus may have a longer latency. In other words, memory access requests may belong to a memory access class, with each memory access class having a different latency. An example of a system with different memory access classes is described below.

This variable latency can introduce a problem when accessing memory with different latency. For example, a processor may have a queue that stores all memory requests that have not yet been completed. This queue may have a finite size. It is possible that memory access requests that have a long latency may cause the queue to become full, thus preventing memory access requests that have shorter latency from completing.

For example, assume that there are two memory access classes, one with a 100 ns latency (short), and another with a 500 ns latency (long). Also assume the queue is able to hold 10 outstanding memory requests at a time. Assume a steady flow of memory access requests from both access classes, and that those requests arrive in round robin fashion (e.g. alternate short and long memory access classes). The queue may be initially empty, but under the previous assumptions, will immediately fill up with 5 long requests and 5 short. After 100 ns, all 5 of the short requests would complete. Using the round robin policy, in the best case, 3 short requests and 2 long requests are added. Thus, the queue would then have 7 long requests and 3 short requests. Now, after another 100 ns passes, the 3 short request in the queue complete. Again, using round robin scheduling, they might be replaced with 2 short requests, and 1 long request, resulting in a total of 2 short requests and 8 long requests in the queue.

As should be clear, the percentage of the queue that is occupied by the long requests continues to increase. At some point, the long latency requests may completely fill the queue, thus causing starvation of the short latency requests.

The techniques described herein avoid the problem of long latency memory accesses requests crowding out lower latency requests. The space in the memory pending queue is initially allocated between all possible memory access classes. Note, the space need not be allocated evenly. Some memory access classes may be initially allocated a larger amount of the queue than others.

Stall counters are established for each memory access class. A period of time may be defined in terms of a number of processor cycles. On each processor cycle, if a memory request for a certain class is received and is unable to be placed in the queue (because the queue is full), the stall counter for that memory access class is incremented. At the end of the period of time, the number of stall cycles for each memory class may be divided by the total number of cycles for the period of time. Thus, it can be determined for what percentage of the period of time memory access requests of a given class were stalled (i.e. for what percentage of cycles memory access requests could not be queued, because the queue was full).

If the percentage for a given memory access class exceeds a threshold, this may indicated the allocation of the queue for that particular access class is too low. Likewise, if the percentage does not exceed a threshold, this may indicate that the allocation to the particular memory access class is too high. The techniques described herein may then reallocate the queue by increasing the allocation of the queue to memory access classes that are stalled, while decreasing the allocation to memory access classes that are not stalled.

Figure 1A:
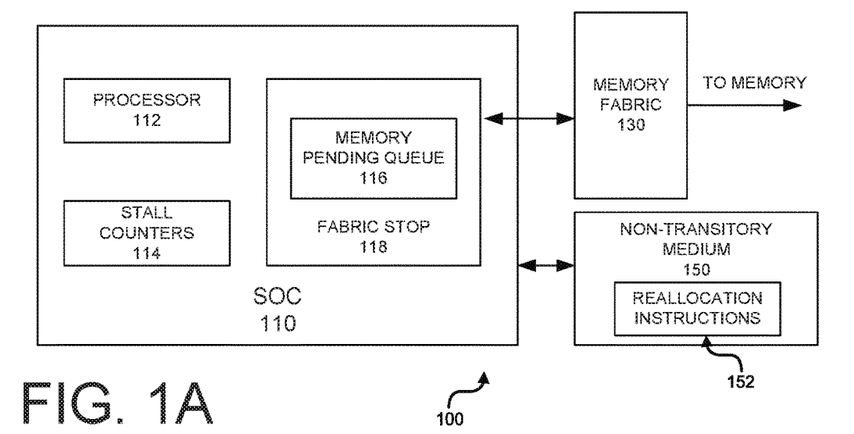
Figure 1B:
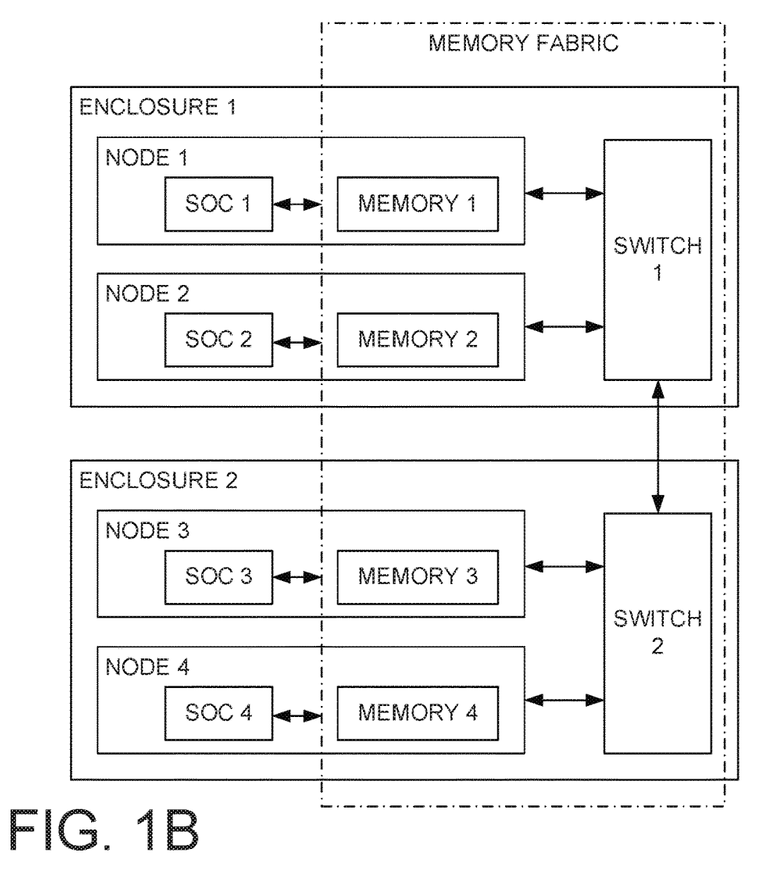

FIGS. 1(A,B) are examples of a node and system including an SoC that may be used with the reallocation of memory pending queues according to the techniques described herein. FIG. 1A depicts an example of components that may be included on a node. The node 100 may include a SoC 110 coupled to a non-transitory computer readable medium 150.

The SoC 110 may include a processor 112. The processor may be any type of electronic component capable of executing instructions stored on the medium 150. For example, the processor may be a central processing unit (CPU), graphics processing unit (GPU), field programmable gate array (FPGA), application specific integrated circuit (ASIC), or any other suitable processing resource. The SoC may also include a plurality of stall counters 114. The stall counters may be used to determine which classes of memory access are currently stalled. Operation of the stall counter is described in further detail below.

The SoC may also include a fabric stop 116. The fabric stop may be an interface between the SoC and the memory fabric. In other words, the processor 112 accesses memory by sending a request to the fabric stop 116. The fabric stop may then be responsible for interfacing with the memory fabric in order to fulfill the processor's memory request.

The fabric stop 116 may include a memory pending queue (MPQ) 118. The MPQ may be thought of as a queue that holds all pending memory requests. In other words, the MPQ holds all memory access requests from the processor that have not yet been fulfilled from the memory fabric. It should be understood that the MPQ has a finite size. In some cases, a memory request from a processor cannot be accepted because the MPQ is full. Such a condition may be referred to as a stall condition, or simply a stall. Stalls will be described in further detail below.

Although the description above described the memory fabric stop 116 as part of the SoC 110 the techniques described herein are not limited to such a structure. In other example implementations, the fabric stop may be external to the SoC, such as on a different integrated circuit. Likewise, the stall counters 114 may be included on the SoC, on the fabric stop, or elsewhere. What should be understood is that the techniques described herein are not limited to any particular placement or ordering of the components described above, but rather are operable regardless of the particular architecture of the node.

The SoC may be coupled to a non-transitory medium 150. The medium 150 may include thereon a set of instructions that when executed by the processor cause the processor to implement the techniques described herein. For example, the reallocation instructions 152 may be similar to the instructions described in FIGS. 2-6 below. The SoC may also be coupled to a memory fabric 130. As explained above, the processor sends memory access requests to the fabric stop. The fabric stop then places those requests on the memory fabric. The requests are received by the memory (not shown) and the memory responds over the fabric, back to the fabric stop. Operation of the fabric is described in further detail below.

FIG. 1B depicts an example of a system that may be made up of SoCs 110 described above. For example, SoC 1-4 may have a structure similar to SoC 110 described above. Each SoC 1-4 may be included on a node 1-4. The nodes may also be referred to as a node board. In some implementations, each node board is printed circuit assembly, such as a blade.

Each node 1-4 may also include a memory 1-4. Although the memory may be located on a node board, this does not mean that the memory on the node is only usable by that node. As explained above, there may be a memory fabric to which all memory is connected. Thus memory 1-4 is connected to the memory fabric, which is depicted in FIG. 1B as a dashed line box. The memory fabric may include a plurality of components, such as switches 1-2. The switches may allow memory requests to the fabric to be routed to the appropriate memory.

In some implementations, multiple nodes may be aggregated together in an enclosure. For example, as shown nodes 1-2 are in enclosure 2, while nodes 3-4 are in enclosure 2. It should be understood that the particular number of nodes in an enclosure, or the number of enclosures is not important. Rather, it should be understood that there are different latencies for memory access, depending on where the memory is located. The structure described herein is merely for purposes of explanation.

As mentioned above, the latency for accesses to each class of memory may be different. For example, one memory access class may be a node accessing memory that is on the same node. For example, node 1 may access memory 1. Such a memory access class may have a low latency relative to other memory access classes described below.

Another memory access class may be when a node accesses memory that is located on a different node, but within the same enclosure. For example, if node 1 were to access memory 2. As should be clear, the latency of such an access may be greater than accessing memory that is on the same node because the request must pass through switch 1 to travel from node 1 to memory 2. A third memory access class may be when a node access memory that is on another node in a different enclosure. For example, node 1 may access memory 3. Again, it should be clear that such an access may have a relatively higher latency, as the request must pass through both switch 1 and 2 in order to reach memory 3.

Once again, it should be understood that the structure described above is merely for purposes of explanation. What should be understood is that there are different memory access classes, with each class having different amounts of latency. The particular layout of that memory is irrelevant. For example, in an alternate structure, a single node board may contain three different types of memory, which due to the physical characteristics of each type of memory, cause the latency of each type of memory to be different.

It should further be understood that the techniques described herein are not limited to three memory access classes, but rather can be reduced to two memory access classes, or extended to any number of memory access classes. Again, what should be understood is that there may be more than one memory access class, and that each class may have a different latency.

In operation, the total number of queue entries in the MPQ 116 may be allocated to each possible memory access class. In the example being described, there may be three memory access classes; same node; different node, same enclosure; and different node different enclosure. Each memory access class may have a different latency. The allocation of the MPQ to each class of memory access need not be uniform. In addition, the stall counters 114 for each memory access class may be reset.

The stall counters may be incremented for a memory access class each time a memory access request for that class is received but is unable to be added to the MPQ. For example, if on a given processor cycle an attempt is made to add a memory access request to the MPQ, but the MPQ is full, the stall counter for that memory access class may be incremented. This process may continue for a defined period of time. When the period of time concludes, an MPQ reallocation process may occur, as is described in further detail below.

At the end of the period of time, it may be determined if any of the memory access classes are stalled. A memory access class may be considered stalled when the stall counter for that memory access class exceeds a threshold for the period of time. The threshold may be set independently for each memory access class. In some implementations the memory access class may be considered stalled if the stall counter exceeds a defined threshold. In other implementations, the memory access class may be considered stalled when the total number of stall cycles for the class divided by the total number of processor cycles for the period of time exceeds a certain percentage.

Thus, at the end of the period of time, it may be determined which memory access classes are stalled and which ones are not. In one example implementation, only the memory access class with the largest stall counter (e.g. the memory access class that has spent been rejected from the MPQ more than any other memory access class) is considered stalled.

The system may then go through a MPQ reallocation process. At a high level, the process can be thought of as removing MPQ allocation from memory access classes that are not stalled, and granting them to those classes that are stalled. The process for performing this reallocation is described in further detail below. The stall counters may then be reset prior to the start of the next defined time period. This process may continue as long as the system is running, thus allowing for the allocation of the MPQ to be continuously adjusted based on the current memory access patterns of the workload running on the system.

Figure 2:
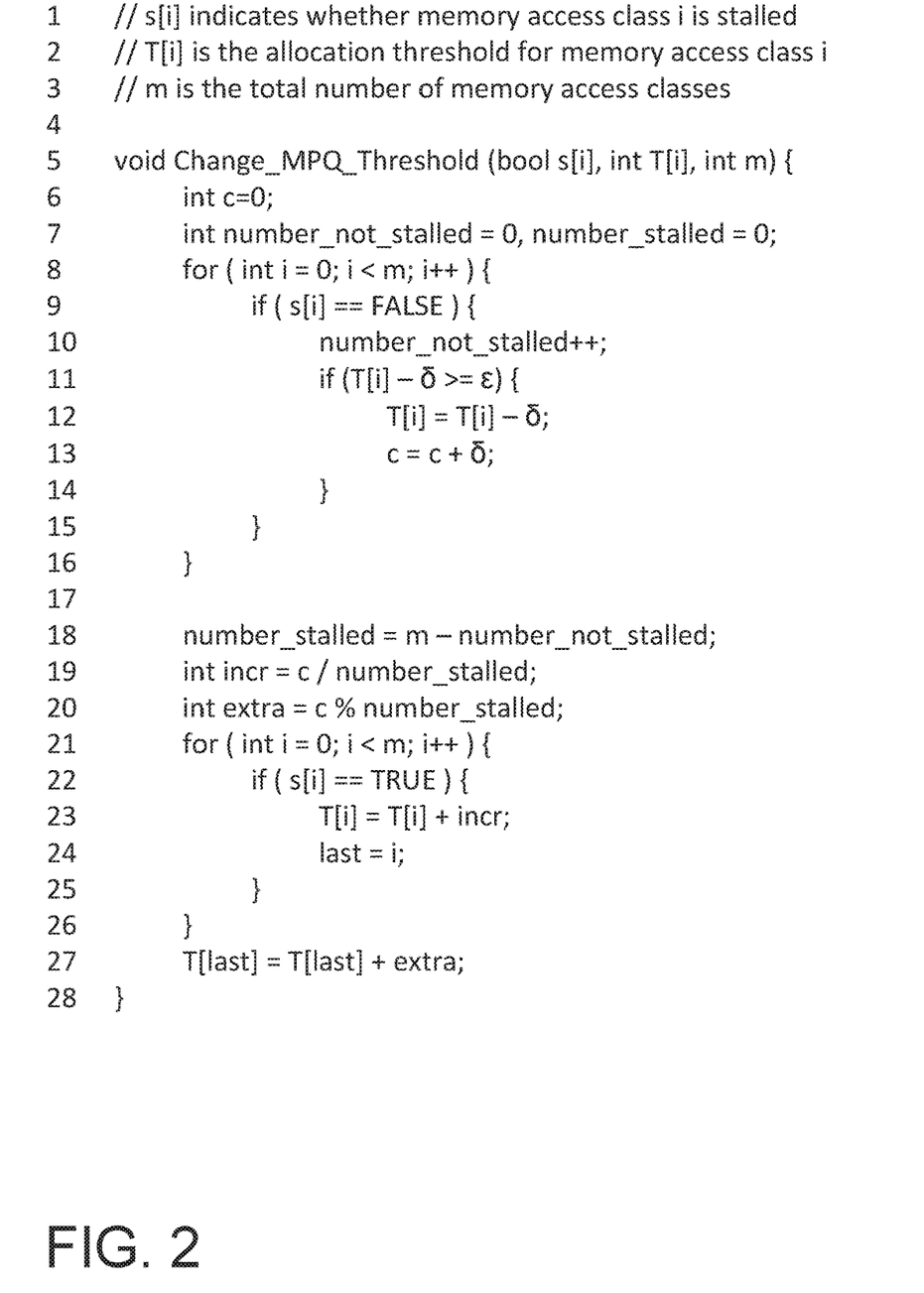
FIG. 2 is an example of pseudo code that may be used to implement the reallocation techniques described herein.

FIG. 2 is an example of pseudo code that may be used to implement the reallocation techniques described herein. It should be understood that the pseudo code depicted in FIG. 2 is for purposes of description only. The techniques described herein are usable with any number of alternative implementations. The pseudo code in FIG. 2 describes one possible way of reallocating the space available in the memory pending queue between the various classes of memory.

Lines 1-3 set forth some basic definitions that will be useful further below. For example, assume that the system has three memory access classes, such as a node level (0), an enclosure level (1), and a rack level (2). The array s[i] may be a Boolean array that indicates if the particular indexed memory access class is currently stalled. For example, is s[1] equals TRUE, this may mean that the enclosure level memory access class is currently stalled. Likewise s[2] equals FALSE may indicate the rack level memory access class is not stalled.

In line 2, the array T[i] may indicate the allocation threshold for memory access class i. For example, if the MPQ is 1000 slots, and the current threshold for the node level access class is 100, then T[0] may equal 100. The variable m may be used to indicate the total number of possible memory access classes. As mentioned above, even though the description herein generally includes three levels of memory access classes (e.g. node, enclosure, and rack), the techniques described are in no way limited to 3 access class levels. As should be clear, the techniques are extensible to any number of memory access classes.

Line 5 sets forth a function, Change_MPQ_Threshold that may be used to change the threshold of the amount of the MPQ allocated to each memory access class. The function may take as inputs the s[i] array, the T[i] array, and the total number of memory access classes m, described above. In lines 6 and 7, several variables are initialized. Variable c is used to keep track of the available number of entries in the MPQ that are available for reallocation. The variables number_not_stalled and number_stalled may be used to keep track of the number of memory access classes that are not stalled or are stalled, respectively.

In lines 8 through 16, a loop is executed, with the control value being the variable m. In other words, lines 9-15 execute one time for each possible memory access class. At line 9, the s[ ] array for the current memory access class is checked to determine if the memory access class is stalled. As explained above, the memory access class may be considered stalled based on the stall cycle counter for the memory access class. If the result of the comparison is FALSE, it means that the memory access class is not stalled. As such, the number_not_stalled variable is incremented in line 10.

In line 11, the T[ ] array is checked to determine if reducing the allocation of the MPQ for the current memory access class will cause the allocation to drop below a minimum threshold. The allocation amount δ, which is an amount of MPQ capacity that might be removed for the current allocation, is subtracted from the current allocation. If that subtraction causes the allocation amount for the memory class to drop below the value ε (the minimum allocation threshold), no action is taken, and none of the allocation is removed from the current memory access class.

If subtracting δ from the current allocation does not cause the allocation to drop below the minimum threshold ε, then in line 12, an amount δ is subtracted from the allocation for the current memory access class. In line 13, the value δ is added to the current value of c, which keeps track of the amount of the MPQ that is available for reallocation.

In other words, in lines 8-16, each memory access class that is not stalled is examined to determine if it can lose an amount of MPQ allocation δ without falling below the minimum allocation threshold ε. If it can tolerate such a reduction, the allocation δ is added to a pool that is available for reallocation. If the memory access class cannot tolerate such a reduction, the allocation for that memory access class remains the same.

In line 18, it may be determined how many memory access classes are stalled by subtracting the number of classes determined to be stalled (determined above though iteration of line 10). In line 19, c (the total amount of MPQ available for reallocation) is divided by the total number of memory access classes that are stalled. This may determine the amount of allocation (i.e. incr) that will be added to each stalled access class. Due to the nature of computing systems, the amount of MPQ available for reallocation may not be evenly divisible by the number of stalled memory access classes. In line 20, a modulus operation is performed to determine the remainder (i.e. extra) from the operation in line 19.

In lines 21-26 a loop through all memory classes is performed. In line 22, the s[ ] array is checked for each memory access class to determine if the access class is stalled. If it is stalled, in line 23 the incr amount, which was determined in line 19, is added to the current allocation threshold for the class. The variable last is set to equal the memory access class for the current iteration. After the loop from lines 21-26 is complete, the variable last contains the index of the last memory access class that had its allocation increased. In one example implementation, at line 27, the extra allocation may be added to the last memory class.

However, it should be understood that the extra could have been added to any memory access class that was having its allocation increased.

Figure 3:
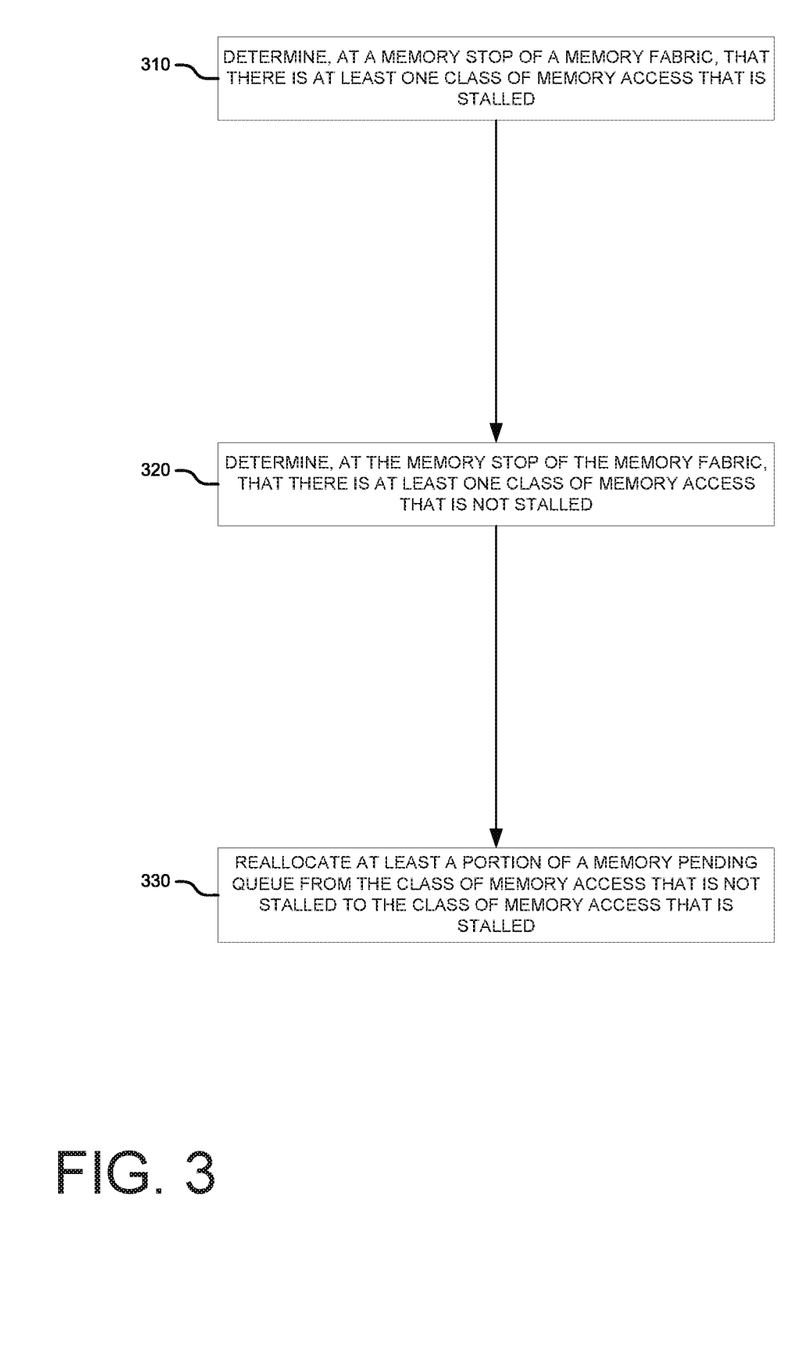
FIG. 3 is an example of a high level flow diagram describing reallocating a portion of a memory pending queue from a non-stalled to a stalled memory access class.

FIG. 3 is an example of a high level flow diagram describing reallocating a portion of a memory pending queue from a non-stalled to a stalled memory access class. The flow diagram depicted in FIG. 3 may be implemented as processor readable instructions, such as the reallocation instructions 152 depicted in FIG. 1. In block 310, it may be determined, at a memory fabric stop of a memory fabric, that there is at least one class of memory access that is stalled. As explained above, a stalled memory access class may be determined, in one implementation, by a stall counter for that memory access class exceeding a threshold. In another example implementation, a memory access class may be considered stalled if it has the highest stall counter of all memory access classes.

In block 320, it may be determined, at the memory stop of the memory fabric that there is at least one class of memory access that is not stalled. In other words, it may be determined that there is at least on class of memory access that is using an amount of its MPQ allocation such that the stall counter does not indicate that the memory access class is stalled. In such a case, it may be possible to remove MPW allocation from a memory access class that is not stalled without causing the memory access class to become stalled.

In block 330, at least a portion of a memory pending queue from the class of memory access that is not stalled may be reallocated to the class of memory access that is stalled. In other words, a portion of the MPQ that was allocated to a memory access class that is not stalled may be reallocated to one that is stalled.

Figure 4:
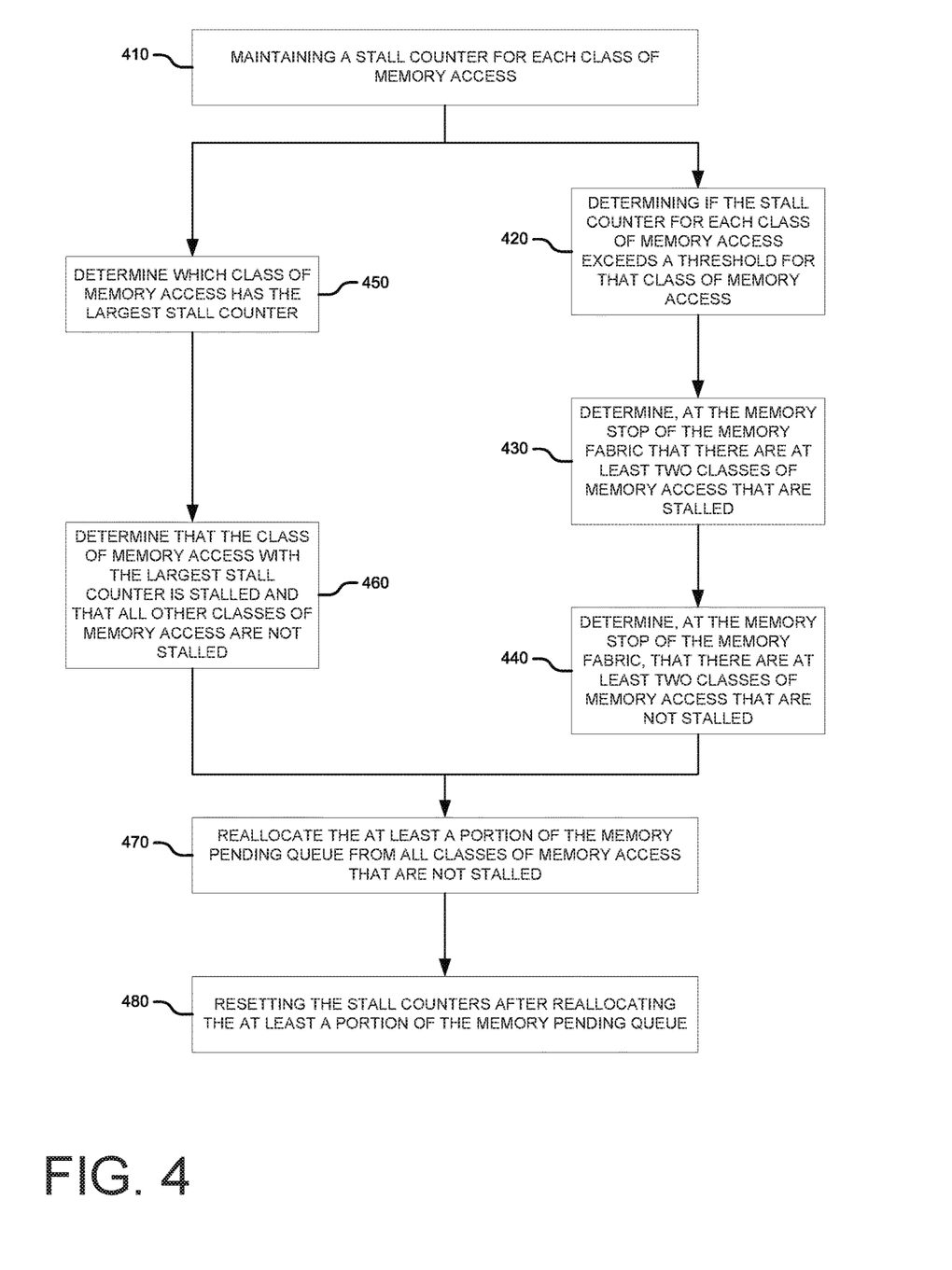
FIG. 4 is an example of a high level flow diagram for reallocating a portion of a memory pending queue from multiple non-stalled memory classes to multiple stalled memory classes.

FIG. 4 is an example of a high level flow diagram for reallocating a portion of a memory pending queue from multiple non-stalled memory classes to multiple stalled memory classes. The flow diagram depicted in FIG. 4 may be implemented as processor readable instructions, such as the reallocation instructions 152 depicted in FIG. 1. In block 410, a stall counter may be maintained for each class of memory access. As explained above, the stall counter may be used to determine if a given class of memory access is stalled, which may indicate a situation in which not enough of the MPQ has been allocated to the stalled memory access class.

In one implementation, the process may move to block 420. In block 420, it may be determined if the stall counter for each class of memory access exceeds a threshold for that class of memory access. As explained above, in some implementations, a memory access class is considered stalled if the stall counter for that class indicates that the class has been stalled for a number of cycles that exceeds the threshold for that class. In short, in block 420, it is determined which memory access classes are stalled.

In block 430, it may be determined, at the memory stop of the memory fabric that there are at least two classes of memory access that are stalled. In other words, in the example implementation of FIG. 4, it may be assumed that at least two classes of memory access were determined to be stalled in step 420.

In block 440, it may be determined at the memory stop of the memory fabric that there are at least two classes of memory access that are not stalled. In other words, in the example implementation of FIG. 4, it may be determined that there are at least two classes of memory access that are not stalled. As described above, memory access classes that are not stalled may have some of their MPQ allocation removed.

In block 470, the at least a portion of the memory pending queue from all classes of memory access that are not stalled may be reallocated. As explained above, the memory access classes that are not stalled may have a portion of their MPQ allocation removed. This portion of MPQ allocation may then be available for reallocation to those memory access classes that are indicated as stalled. For example, the stalled memory access classes may be determined in block 420, 430 and the available MPQ allocation from non-stalled classes may be determined in block 440. In block 480, the stall counters may be reset after reallocating the at least a portion of the memory pending queue. As explained above, the allocations are not static. At the end of each allocation period, the stall counters are reset, in preparation for determining which memory access classes are stalled for the next period.

In an example of an alternate implementation, in block 450 it may be determine which memory access class has the largest stall counter. This may be indicative of the memory access class that is suffering from the greatest number of stalls. In some implementations, it is only the memory access class that is experiencing more stalls than all other memory access classes that is given a larger allocation of the MPQ.

In block 460 of this alternate implementation, it may be determined that the class of memory access with the largest stall counter is stalled and that all other classes of memory access are not stalled. In other words, the memory access class with the largest stall counter is indicated as stalled, but no other memory access class (even if it is actually stalled) is indicated as stalled. Thus, any reallocation that occurs will reallocate MPQ allocation to only the memory access class with the greatest stall counter.

Figure 5:
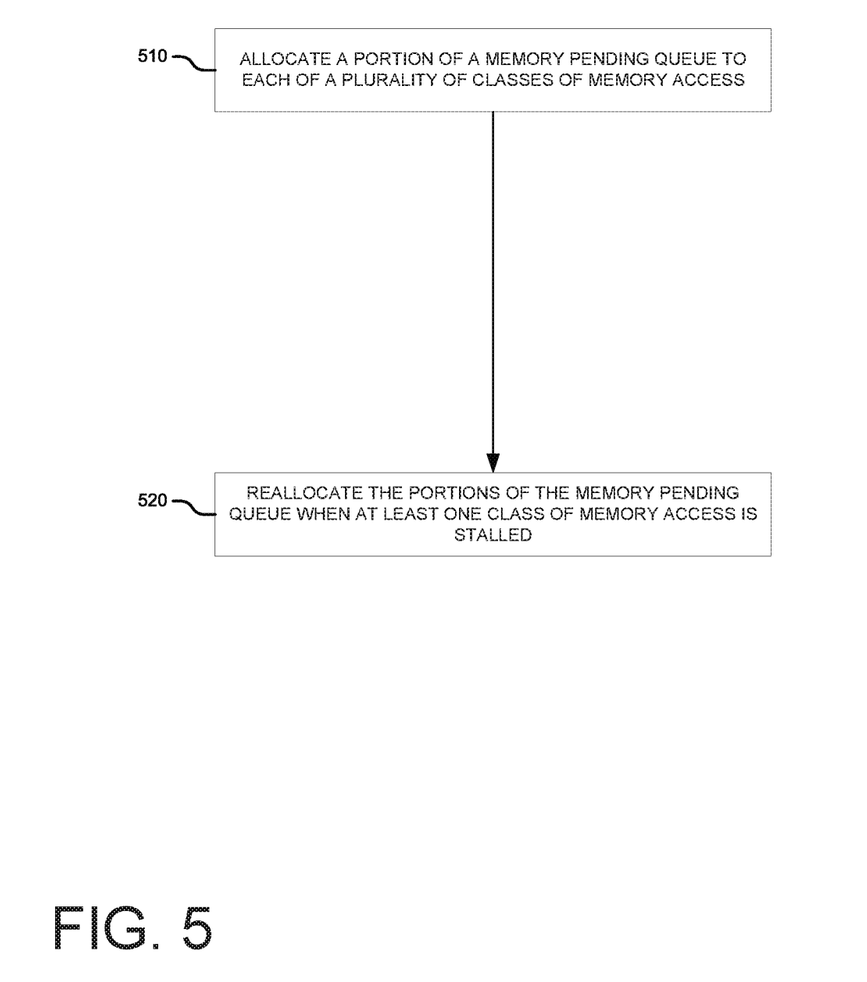
FIG. 5 is an example of reallocating portions of a memory pending queue based on stalls as described herein.

FIG. 5 is an example of reallocating portions of a memory pending queue based on stalls as described herein. The flow diagram depicted in FIG. 5 may be implemented as processor readable instructions, such as the reallocation instructions 152 depicted in FIG. 1. In block 510, a portion of a memory pending queue may be allocated to each of a plurality of classes of memory access. As explained above, each class of memory access classes may be initially allocated a portion of the MPQ. Put another way, at the beginning of each interval, the entire MPQ is allocated to each class of memory access. Each class may not be allocated the same amount of capacity from the MPQ.

In block 520, the portions of the memory pending queue may be reallocated when at least one class of memory access is stalled. As explained above, a memory access class may be considered stalled when the class experiences a level of stalls that exceeds a threshold. Exceeding the threshold may indicate that an insufficient portion of the MPQ has been allocated to the particular class that is stalled. In block 520, portions of the MPQ may be reallocated to attempt to alleviate the stall condition of stalled memory access classes.

Figure 6:
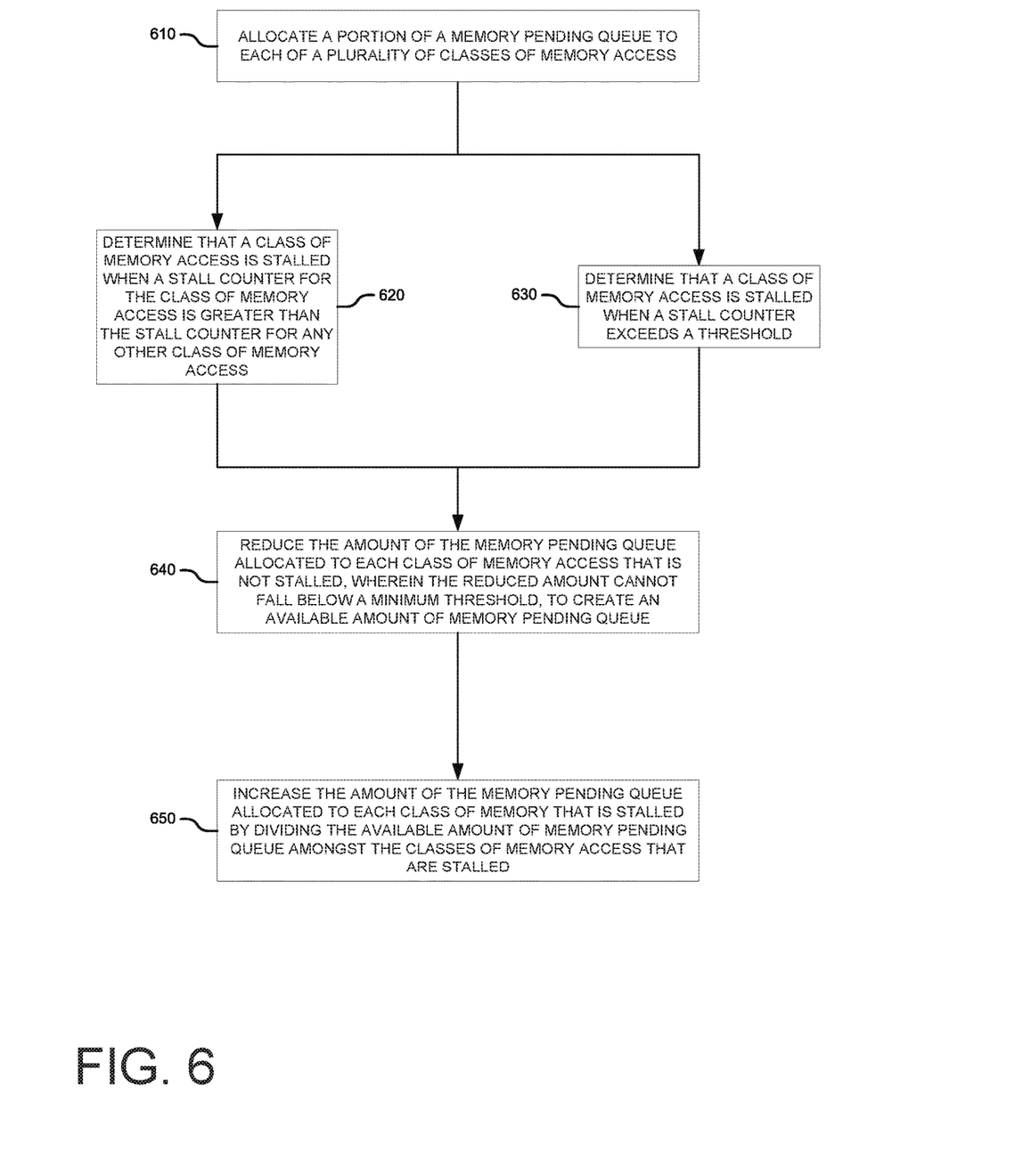
FIG. 6 is another example of reallocating portions of a memory pending queue based on stalls as described herein.

FIG. 6 is another example of reallocating portions of a memory pending queue based on stalls as described herein. The flow diagram depicted in FIG. 6 may be implemented as processor readable instructions, such as the reallocation instructions 152 depicted in FIG. 1. In block 610, just as above in block 510, a portion of a memory pending queue may be allocated to each of a plurality of classes of memory access.

In one example implementation, the process may move to block 620. In block 620, it may be determined that a class of memory access is stalled when a stall counter for the class of memory access is greater than the stall counter for any other class of memory access. In other words, the memory access class with the greatest number of stalls is considered as the only memory access class that is stalled.

In an alternate example implementation, the process moves to block 630. In block 630, it may be determined that a class of memory access is stalled when a stall counter exceeds a threshold. In other words, unlike the previous example implementation, multiple memory access classes may be stalled at the same time.

Regardless of the implementation, the process may move to block 640. In block 640, the amount of the memory pending queue allocated to each class of memory access that is not stalled may be reduced. However, the reduced amount cannot fall below a minimum threshold. In other words, each memory access class is guaranteed at least some minimum allocation of the MPQ. The allocation that is reduced from each non-stalled memory access class may create an available amount of memory pending queue.

In block 650, the amount of the memory pending queue allocated to each class of memory that is stalled may be increased. The increase may come from dividing the available amount of memory pending queue that was determined in block 640 amongst the classes of memory access that are stalled.

We claim:

1. A method comprising:
    determining, at a memory stop of a memory fabric, that a first class of memory access is stalled;
    determining, at the memory stop of the memory fabric, that a second class of memory access is not stalled, wherein the determining that the first class of memory access is stalled and the second class of memory access is not stalled is based on a first stall counter maintained for the first class of memory access having a value that is greater than a value of a second stall counter maintained for the second class of memory access; and
    reallocating a portion of a memory pending queue from the second class of memory access that is not stalled to the first class of memory access that is stalled.

2. The method of claim 1, further comprising:
    determining, at the memory stop of the memory fabric, that at least two classes of memory access are stalled; and
    reallocating the portion of the memory pending queue to all classes of memory access are stalled.

3. The method of claim 1, further comprising:
    determining, at the memory stop of the memory fabric, that at least two classes of memory access are not stalled; and
    reallocating the portion of the memory pending queue from all classes of memory access that are not stalled.

4. The method of claim 1, wherein determining that the first class of memory access is stalled further comprises:
    determining that the first stall counter for the first class of memory access exceeds a threshold for the first class of memory access.

5. The method of claim 1, further comprising:
    resetting the first and second stall counters after reallocating the portion of the memory pending queue.

6. The method of claim 1, wherein determining that the first class of memory access is stalled comprises:
    determining that the first stall counter for the first class of memory access has a largest value from among stall counters for respective classes of memory access; and
    determining that the first class of memory access is stalled and that all other classes of memory access are not stalled.

7. The method of claim 1, wherein a portion of the memory pending queue allocated to each class of memory access cannot fall below a minimum threshold.

8. The method of claim 1, further comprising:
    incrementing the first stall counter in response to being unable to place a memory request for the first class of memory access in the memory pending queue; and
    incrementing the second stall counter in response to being unable to place a memory request for the second class of memory access in the memory pending queue.

9. The method of claim 8, further comprising:
    after a specified time period, comparing values of the first and second stall counters.

10. The method of claim 1, further comprising:
    initially allocating a respective portion of the memory pending queue to each class of a plurality of classes of memory access comprising the first and second classes of memory access.

11. A method comprising:
    determining, at a memory stop of a memory fabric, that a first class of memory access is stalled;
    determining, at the memory stop of the memory fabric, that a second class of memory access is not stalled, wherein the first and second memory access classes are part of a plurality of memory access classes comprising:
      a node level memory access class;
      an enclosure level memory access class; and
      a rack level memory access class; and
    reallocating a portion of a memory pending queue from the second class of memory access that is not stalled to the first class of memory access that is stalled.

12. A non-transitory processor readable medium containing a set of instructions thereon that when executed cause a device to:
    allocate a portion of a memory pending queue to each of a plurality of classes of memory access;
    reallocate the portions of the memory pending queue in response to a given class of memory access being stalled; and
    determine that the given class of memory access is stalled in response to a stall counter for the given class of memory access being greater than a stall counter for any other class of memory access.

13. The non-transitory processor readable medium of claim 12, wherein the instructions when executed cause the device to further:
    determine that the given class of memory access is stalled further in response to the stall counter for the given class of memory access exceeding a threshold.

14. The non-transitory processor readable medium of claim 12, wherein reallocating the portions of the memory pending queue comprises:
    reducing an amount of the memory pending queue allocated to each class of memory access that is not stalled, wherein the reduced amount cannot fall below a minimum threshold, to create an available amount of memory pending queue; and
    increasing an amount of the memory pending queue allocated to each class of memory that is stalled by dividing the available amount of memory pending queue amongst the classes of memory access that are stalled.

15. The non-transitory processor readable medium of claim 12, wherein the instructions when executed cause the device to:

increment the stall counter for the given class of memory access in response to being unable to place a memory request for the given class of memory access in the memory pending queue.

16. The non-transitory processor readable medium of claim 15, wherein the instructions when executed cause the device to:

after a specified time period, comparing values of the stall counters for the plurality of classes of memory access.

17. A device comprising:

a processor;

a fabric attached memory, the fabric attached memory to store memory access requests for different memory access classes, wherein a latency of memory access for each memory access class is different;

a memory fabric stop to couple the processor to a memory fabric, wherein the fabric stop includes a memory pending queue to receive the memory access requests from the processor, the memory fabric stop further including a respective stall counter per respective memory access class, the respective stall counter to determine when the respective memory access class is stalled, and the processor to:

determine if the stall counter for each memory access class has exceeded a threshold; and reallocate utilization of the memory pending queue based on the stall counters, the reallocating comprising reallocating portions of the memory pending queue away from any memory access class that has not exceeded the threshold to the memory access classes that have exceeded the threshold.

18. The device of claim 14, wherein a first stall counter for a first memory access class of the different memory access classes is to increment in response to being unable to place a memory request for the first memory access class in the memory pending queue.

* * * * *